Figure 5:
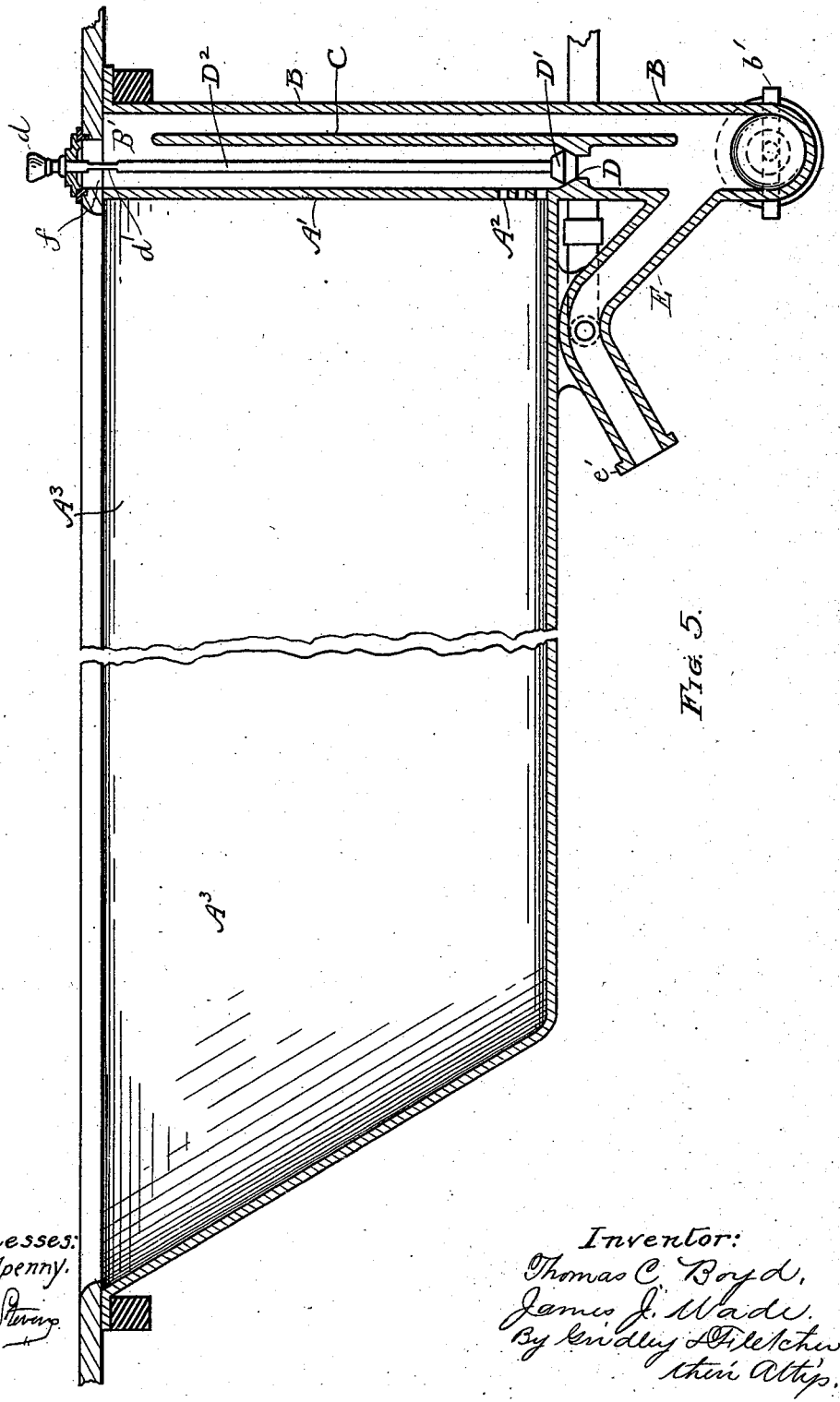

(No Model.) 2 Sheets—Sheet 1.
T. C. BOYD & J. J. WADE.
STATIONARY WASH BOWL.
No. 380,083. Patented Mar. 27, 1888.
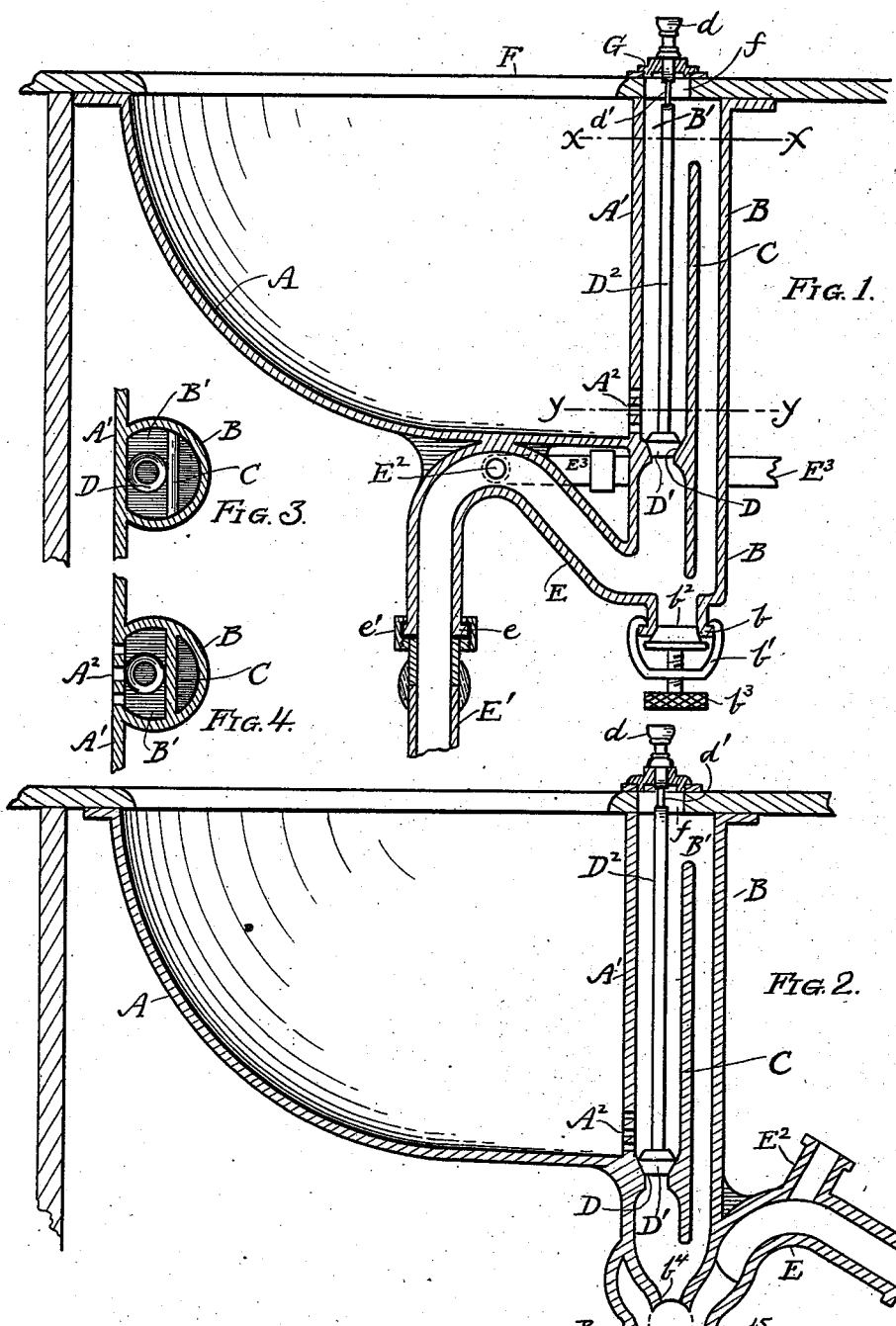

(No Model.) 2 Sheets—Sheet 2.

T. C. BOYD & J. J. WADE.
STATIONARY WASH BOWL.

No. 380,083. Patented Mar. 27, 1888.

Witnesses:
J. S. Halpenny.
David Stevens

Inventor:
Thomas C. Boyd,
James J. Wade.
By Gridley & Fletcher,
their Attys.

UNITED STATES PATENT OFFICE.

THOMAS C. BOYD AND JAMES J. WADE, OF CHICAGO, ILLINOIS.

STATIONARY WASH-BOWL.

SPECIFICATION forming part of Letters Patent No. 380,083, dated March 27, 1888.

Application filed October 15, 1887. Serial No. 252,420. (No model.)

*To all whom it may concern:*

Be it known that we, THOMAS C. BOYD and JAMES J. WADE, of Chicago, in the county of Cook and State of Illinois, have invented certain new and useful Improvements in Stationary Wash-Bowls, of which the following is a description, reference being had to the accompanying drawings, forming a part of this specification, in which—

Figure 1 is a vertical sectional view of a wash-bowl having our improvement applied thereto. Fig. 2 is a like view showing a modification of the same. Fig. 3 is a sectional plan view in detail upon the line $x\ x$, Fig. 1. Fig. 4 is a like view upon the line $Y\ Y$, Fig. 1; and Fig. 5 is a longitudinal sectional view of a bath-tub, showing a modification of our improvement applied thereto.

Like letters of reference indicate like parts in the different figures.

Our invention is particularly applicable to stationary wash-bowls and bath-tubs; and our object is to so construct a combined "overflow" and trap that the bowl or other receptacle and said trap and overflow may preferably all be constructed in one piece, and so arranged as not only to dispense with the ordinary chain and plug, but to render all parts of the overflow and trap accessible, so that they may be easily and perfectly cleaned and maintained in a thorough sanitary condition.

To this end our invention consists in the combination and arrangement of parts, as hereinafter shown, described, and claimed.

A in the drawings, Figs. 1 and 2, represents a stationary wash-bowl, of porcelain or other suitable material, the rear wall, A', of which is preferably made vertical, or substantially so, and straight, and in which, immediately above the bottom of the bowl, is located a strainer, A². Upon the rear of the bowl we provide a semi-cylindrical part, B, which is extended considerably beneath the bottom of the bowl, for the purposes hereinafter stated, said part forming a chamber, B', in the rear of the bowl, which is divided by means of a partition, C, extending from a point below but near the top to one near the bottom of the part B, it being essential that said part B should extend below the bowl, substantially as shown. Between the back A' of the bowl and the partition C, at a point on a level with or below the bottom of the bowl, is formed a valve-seat, D, adapted to receive a conical plug, D', upon the lower end of a rod, D², which is operated in the manner hereinafter set forth. Upon the lower end or depending portion of the part B we provide an opening surrounded by a flange, $b$, adapted to receive a clamp, $b'$, which in turn sustains a plug or cap, $b^2$, in position by means of a set-screw, $b^3$.

E is a pipe which is carried upwardly from at or near the lower end of the part B until it connects with or attaches to the bottom of the bowl. From thence it is curved downwardly, and is provided with a flange, $e$, upon its end, to which may be attached a waste-pipe, E, by means of a "union," $e'$. The pipe E, in connection with the depending part B and partition C, serves to form a trap. The upper portion of the pipe E is provided with a flanged neck or pipe, E², to which may be attached a vent-pipe, E³, Fig. 1, to prevent the water from being siphoned from the trap.

F represents the usual marble slab which forms the top of the bowl when placed in position for use. Said slab is perforated at $f$ above the chamber B', and the opening covered by means of a removable screw-cap, G, through which the rod D² loosely projects, a knob, $d$, being formed thereon, by which said rod is manipulated. The rod D² is preferably oval in form where it passes through said cap, and the hole through the cap is of like shape. A short distance below the slab F a notch, $d'$, is formed in the rod, or the rod is rounded, so that upon raising it to that point by means of the knob and partially turning it the rod is suspended and the plunger D' elevated and retained above the valve-seat, thus permitting the water to flow out beneath it. Upon partially turning the knob $d$ the valve falls upon its seat. Should the water be permitted to flow into the bowl when the outlet is closed, it is evident that as soon as it rises to the top of the partition C it will flow over it and down into the trap.

In Fig. 1 the trap is represented as extending toward the front of the bowl. In some cases it may be necessary to carry it in an opposite direction. Such a construction is shown in Fig. 2, in which a valve-seat, $b^4$, is also formed for the reception of a float-valve, $b^5$.

In Fig. 5 we have shown a still further modification of said trap and overflow as applied to an ordinary bath-tub, A³. In such a case we prefer to bend the lower end of the part B, so as to carry it out to a point at or near the side of the tub, thus rendering the opening which is closed by the cap $b^2$ more easy of access.

It will be seen upon reference to the drawings that upon removing the cap G and plug $b^2$ the entire interior of the chamber B', as well as the pipe E, is accessible and may be readily cleaned and kept in a perfect sanitary condition by persons of ordinary skill. Moreover, the forming of the entire fixture in one piece dispenses with the use of the usual "putty-joints" and various metal parts in common use, the objections to which are obvious.

With our improved bowl it is only necessary to make a "union-connection" and a "wipe-joint," as shown at $e^2$, Fig. 1, with the respective pipes after the bowl or tub, as the case may be, is placed in position. Much labor is therefore saved in making connections, and a complete sanitary fixture is the result.

Having thus described our invention, we claim—

1. The combination, with a wash-bowl or similar fixture, of a chamber, B, extending from the top to a point considerably below the bottom of the bowl, an opening, as A², communicating directly therewith, partition C, a valve-seat, D, between said partition and the body of the bowl, valve D', rod D², removable caps, as G $b^2$, at the top and bottom of said chamber, respectively, and curved pipe E, communicating with said chamber at a point near the bottom thereof, said bowl, chamber, partition, and trap being all made integral with each other, and all of said parts being arranged and constructed substantially as shown and described.

2. The combination of the bowl A, chamber B, partition C, valve-seat D, valve D', rod D², caps G $b^2$, bent pipe E, communicating with the lower part of said chamber, and vent E² at the top of the bend thereon, all arranged and constructed substantially as shown and described.

THOMAS C. BOYD.
JAMES J. WADE.

Witnesses:
D. H. FLETCHER,
J. B. HALPENNY.